United States Patent Office 3,112,246
Patented Nov. 26, 1963

3,112,246
STABILIZATION OF HEPARIN PREPARATIONS
Willy Hermann, Muttenz, and Hans Sager, Riehen, Switzerland, assignors to Hoffmann-La Roche Inc., Nutley, N.J., a corporation of New Jersey
No Drawing. Filed Sept. 13, 1960, Ser. No. 55,714
Claims priority, application Switzerland Sept. 28, 1959
7 Claims. (Cl. 167—74)

Heparin preparations are subject to changes upon storage which give rise to alterations in the color of the material. It is especially noticeable in the case of aqueous solutions which gradually become more intensively colored. Although this effect, as far as is now known, does not appear to have any detrimental consequences on the activity of the heparin preparation, it has been an object of study in this field to find a method for stabilizing heparin preparations against such color changes. It is therefore an object of this invention to provide a means for stabilizing heparin preparations, particularly aqueous solutions, against deteriorative changes producing color.

It has been found that heparin preparations may be stabilized against color changes by a combination procedure. This comprises maintaining the preparation in oxygen-free condition in the presence of the sulfite ion.

The sulfite ion exercises a stabilizing effect upon the heparin preparation and also serves to remove traces of oxygen present. The sulfite ion may be provided by adding to the heparin preparation a compound yielding that ion. This includes, for example, alkali bisulfites, alkali sulfites, sulfurous acid, alkali hyposulfites and especially alkali metabisulfites. Alkali metal compounds are preferred and the sodium compounds are particularly desirable for physiological reasons.

Preferably the sulfite-forming substance is added to the heparin preparation in the form of a water solution. The material providing the sulfite ion is used in proportions of 0.4 to 20 weight percent based on the dry heparin substance. The optimum lies at about two weight percent which is advantageous both from the pharmacological and the chemical point of view.

Heparin preparations are marketed primarily in the form of aqueous injectable solutions. In the case of such solutions, it is desirable to add the sulfite ion-forming material to the freshly prepared heparin solution.

In order to realize the full stabilizing action of the sulfite ion, the heparin preparation must be stored with the exclusion of atmospheric oxygen. It is preferable to exclude oxygen during the period that the heparin substance is being made up into the form in which it will be stored as well as during the storage period. The latter is more important, however, and if it is not feasible to make up the heparin preparation in the absence of oxygen, it is at least necessary to store the material in an oxygen-free container.

According to the preferred method of operation, the heparin preparation is made up and the sulfite ion is added in an atmosphere from which oxygen has been removed. This may be accomplished by working the material up under an inert gas. Carbon dioxide and nitrogen are preferred for this purpose. When the heparin preparation is packaged for storage, the container should be evacuated and the material introduced and sealed under an inert atmosphere. The container and its closure should of course be relatively impervious to the penetration of oxygen from the atmosphere.

The sulfite ion also tends to remove traces of oxygen. Therefore an adequate proportion of the substance yielding the sulfite ion should be included so that it binds residual oxygen in the container or which may penetrate upon storage. Proportions within the range described will accomplish this purpose.

Heparin solutions are quite frequently preserved, according to conventional practice, by the addition of phenolic substances. These phenolic substances are themselve subject to chemical change under the influence of oxygen (due to the presence of air or the residue from the oxidative phase in the preparation of the heparin) and this too leads to a color change in the heparin solution. An additional advantage is derived from the use of this invention in such instances. Not only is the decomposition of the heparin material itself retarded but also that of the phenolic preserving agent, so that the solution is stabilized against changes in color due to both factors.

Experiment has shown that when heparin injectable ampuls are prepared with the exclusion of oxygen and in the presence of the sulfite ion according to the method described, the solutions show no noticeable color change upon storage for periods up to two years.

The following example serves to illustrate the invention.

*Example*

0.10 g. of sodium pyrosulfite, 0.32 g. of sodium chloride and 0.50 g. of phenol were successively dissolved with stirring under carbon dioxide in 80 ml. of pyrogen-free distilled water. When the last of the material was in solution, 500,000 I.U. of heparin were sprayed onto the surface. After the heparin went into solution, the pH was adjusted to 6.3 with sodium hydroxide solution. Pyrogen-free, distilled water was added to make a final volume of 100 ml. After thorough mixing, the solution was filtered through a bacterial filter. The filtrate was filled into 5 ml. sterile vials for injection under aseptic conditions and under carbon dioxide gas. The vials were sealed with gas impervious, sterile rubber stoppers. The injection solutions thus prepared showed markedly improved color stability after a storage period of 3 months (45° C.) in comparison with control preparations in which the sodium pyrosulfite was omitted.

Color stable, injectable heparin solutions of the following composition were also prepared according to the foregoing procedure:

(a) 4.30 g. sulfurous acid (2%)
0.32 g. sodium chloride
0.50 g. phenol
500,000 I.U. heparin
Pyrogen-free, distilled water q.s. to 100 ml.

(b) 0.22 g. sodium bisulfite
0.50 g. phenol
2.00 g. ephedrine hydrochloride
4 million I.U. heparin
Pyrogen-free, distilled water q.s. to 100 ml.

We claim:
1. A method for the stabilization of heparin compositions which comprises adding a sulfite ion-forming substance to a heparin composition and storing said composition in an oxygen-free condition.
2. A method as in claim 1 wherein the sulfite ion-forming substance is present in a proportion of 0.4 to 20 weight percent.
3. A method as in claim 1 wherein the sulfite ion-forming substance is sodium metabisulfite.
4. A method for the stabilization of heparin solutions which comprises dissolving heparin in an aqueous solution containing a sulfite ion-forming substance under an inert gas and storing the heparin solution in a container maintained under an inert gas atmosphere.
5. A method as in claim 4 wherein the inert gas is carbon dioxide.
6. A method for the stabilization of heparin solutions which comprises dissolving heparin under an inert gas atmosphere in an aqueous solution containing 0.4 to 20 weight percent of sodium metabisulfite and sealing the solution in a container in which the air has been displaced with an inert gas.

7. A method as in claim 6 wherein the inert gas is carbon dioxide.

References Cited in the file of this patent

UNITED STATES PATENTS

| | | |
|---|---|---|
| 2,047,144 | Kharasch | July 7, 1936 |
| 2,134,679 | Allen | Nov. 1, 1938 |
| 2,899,356 | Greenhalgh | Aug. 11, 1959 |
| 3,039,931 | Beck | June 19, 1962 |

OTHER REFERENCES

Martin: Remington's Practice of Pharmacy, 1956, Mack Pub. Co., Easton, Pa., page 554.